Figure 1:
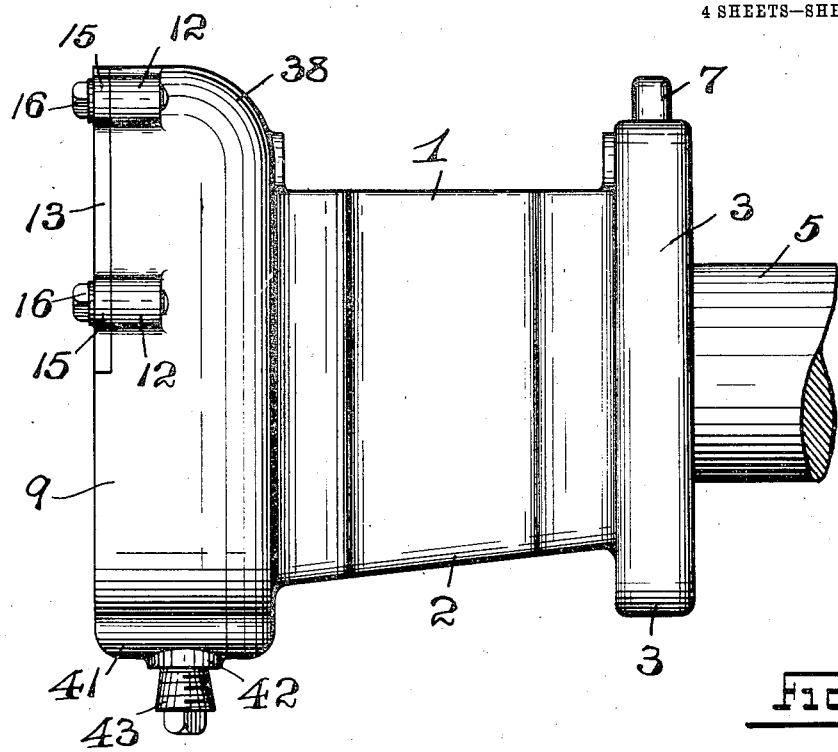

F. H. KOERNER.
JOURNAL BOX.
APPLICATION FILED AUG. 20, 1910.

1,017,295.

Patented Feb. 13, 1912.
4 SHEETS—SHEET 1.

WITNESSES:
Fred'k W. Fraentzel
Harry E. Pfiffer

INVENTOR:
Ferdinand H. Koerner,
BY Fraentzel and Richards,
ATTORNEYS

F. H. KOERNER.
JOURNAL BOX.
APPLICATION FILED AUG. 20, 1910.

1,017,295.

Patented Feb. 13, 1912.

4 SHEETS—SHEET 4.

WITNESSES:
Fredk. C. W. Fraentzel
Harry E. Pfeiffer

INVENTOR:
Ferdinand H. Koerner,
BY Fraentzel and Richards,
ATTORNEYS

UNITED STATES PATENT OFFICE.

FERDINAND H. KOERNER, OF IRVINGTON, NEW JERSEY, ASSIGNOR, BY DIRECT AND MESNE ASSIGNMENTS, OF ONE-THIRD TO ADOLPH F. HENSLER, ONE-SIXTH TO CHARLES F. BEERS, AND ONE-SIXTH TO JOHN HENSLER, ALL OF NEWARK, NEW JERSEY.

JOURNAL-BOX.

1,017,295.      Specification of Letters Patent.      Patented Feb. 13, 1912.

Application filed August 20, 1910. Serial No. 578,220.

*To all whom it may concern:*

Be it known that I, FERDINAND H. KOERNER, a citizen of the United States, residing at Irvington, in the county of Essex and State of New Jersey, have invented certain new and useful Improvements in Journal-Boxes; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, principally, to improvements in self-oiling journal-boxes or bearings, and while it is peculiarly adapted for use as a self-oiling journal box or bearing for car-axle journals, it is also capable of being used as a bearing for shafts of all kinds, pillow-blocks, and such similar uses.

The present invention has for its principal object to provide in connection with the journal-box a novel, simple and efficient means of lubrication for distributing the oil upon the cylindrical surface of a journal or shaft so that the surface of the journal or shaft will be thoroughly and constantly bathed with oil during its revolutions, no matter at what speed the said journal or shaft turns in said journal box; the devices for automatically supplying the oil upon the journal or shaft causing a flow of the same immediately the said journal or shaft begins to turn, so that when said journal or shaft is set in motion it is well lubricated at the start.

A further object of this invention is to provide in connection with said journal-box automatic oil-circulating devices which will lift or convey the oil to the level of and application thereof to the journal or shaft by a purely mechanical operation when said journal or shaft turns at a slow speed; but, which will operate upon principles of centrifugal force when said journal or shaft turns at high speeds.

Other objects of the present invention not at this time more particularly enumerated will be clearly understood from the following detailed description of the same.

With the various objects of the present invention in view, the same consists in the novel construction of self-oiling journal boxes or bearings hereinafter more fully set forth and, furthermore, said invention consists in the various novel arrangements and combinations of parts, as well as in the details of the construction thereof, all of which will be more particularly described in the accompanying specification and then finally embodied in the clauses of the claim appended thereto and forming an essential part thereof.

Figure 2:
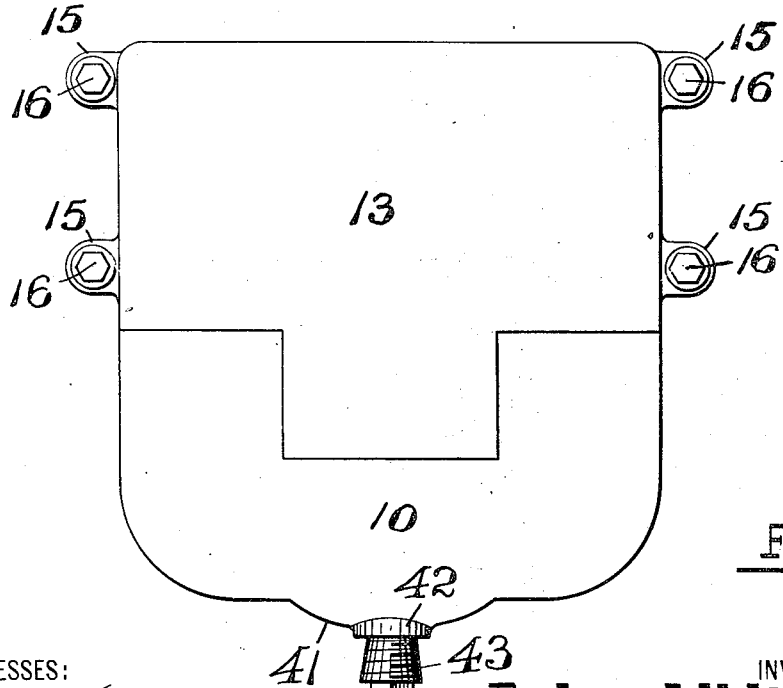
Figure 3:
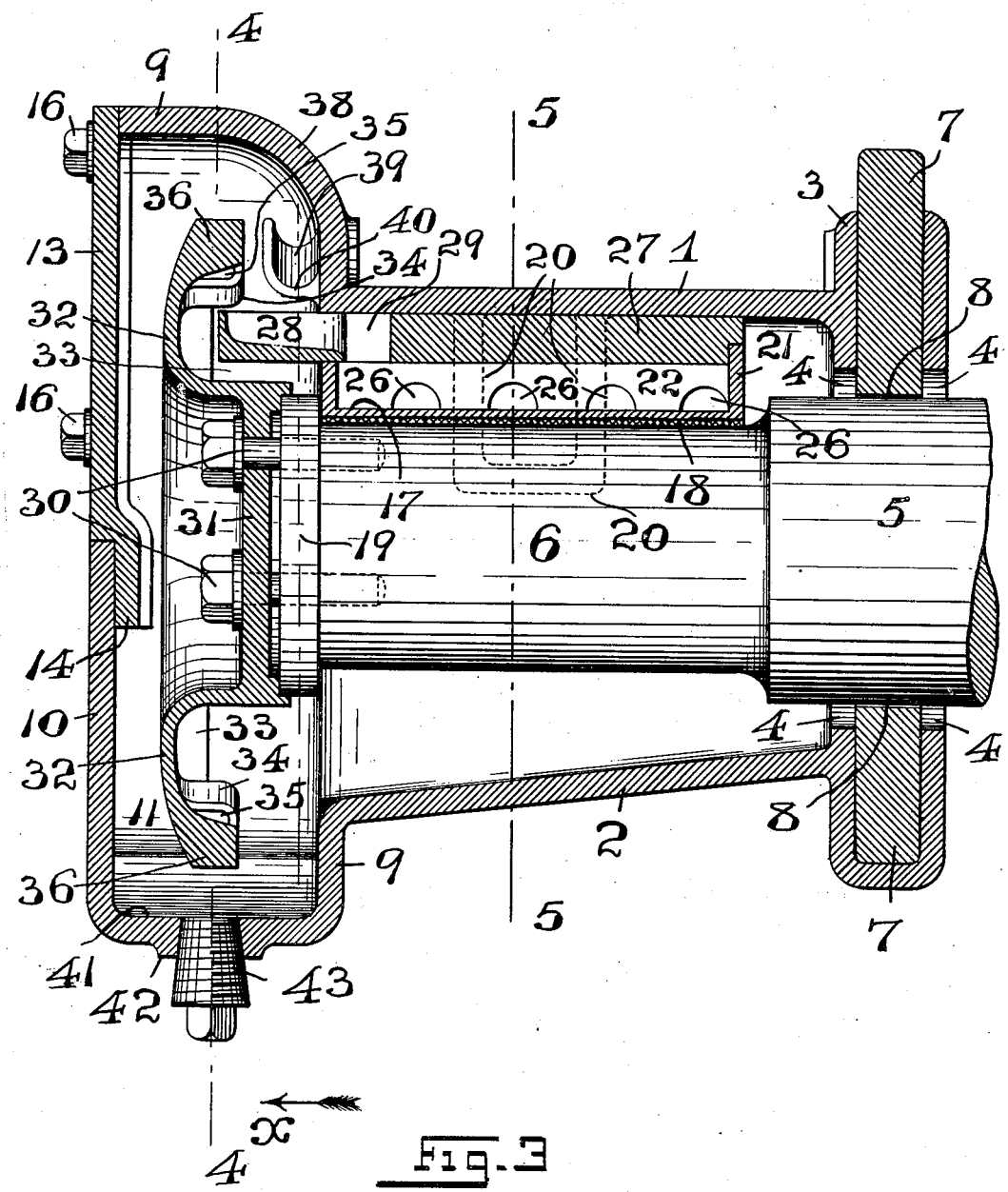
Figure 4:
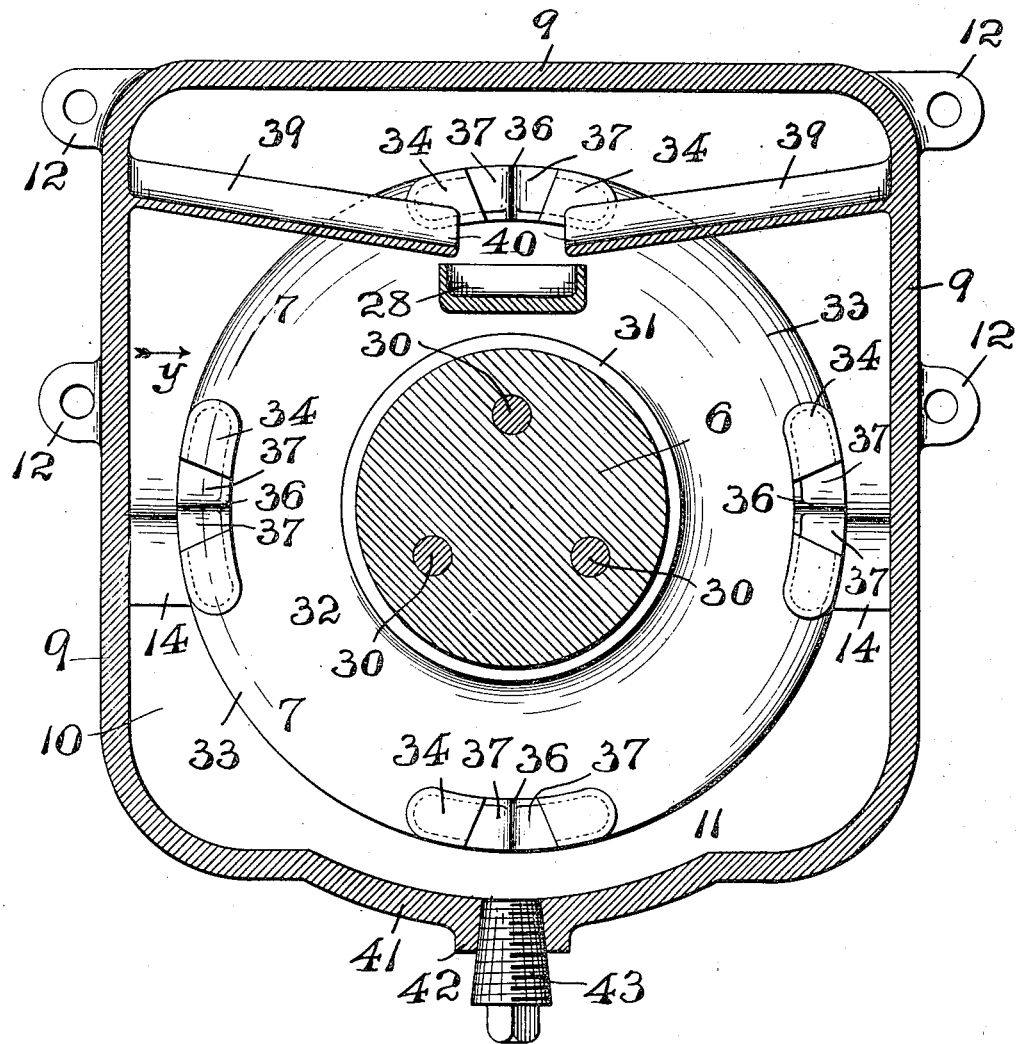
Figure 5:
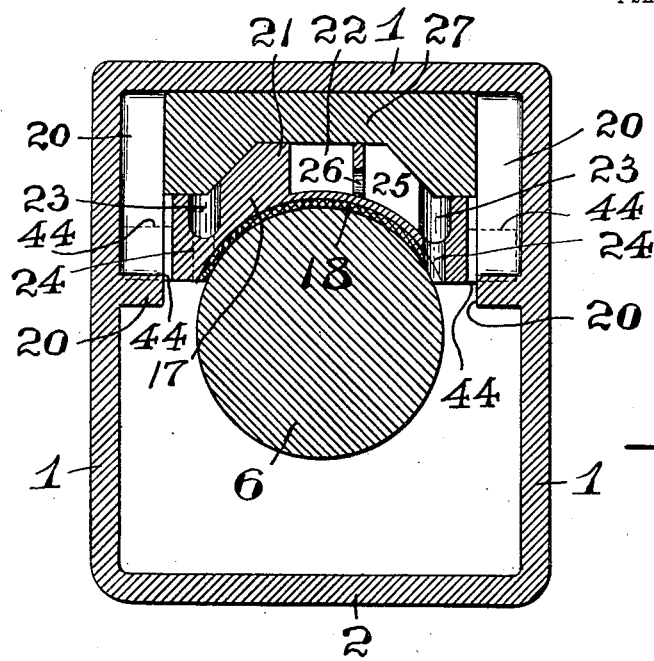
Figure 6:
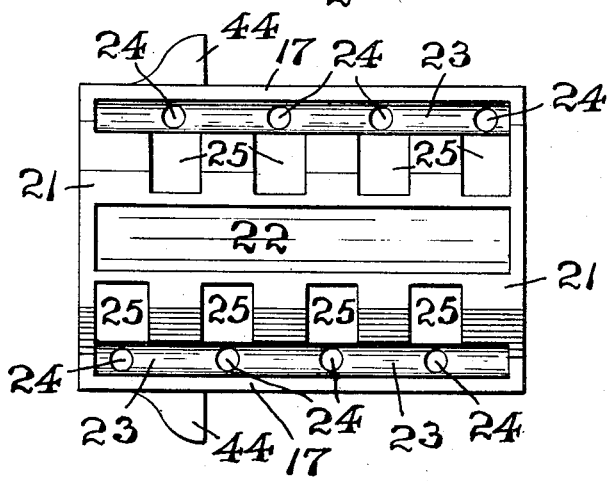
Figure 7:
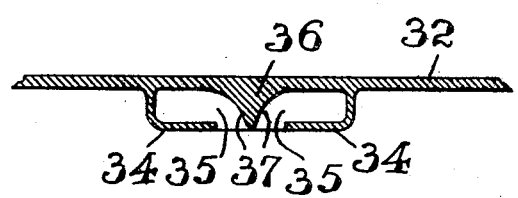

The invention is clearly illustrated in the accompanying drawings, in which:

Figure 1 is a side elevation of the novel construction of self-oiling journal box embodying the principles of the invention; and Fig. 2 is a front end elevation of the same. Fig. 3 is a vertical longitudinal central section of said self-oiling journal box. Fig. 4 is a vertical cross-section of the same taken on line 4—4 in said Fig. 3, looking in the direction of the arrow $x$. Fig. 5 is a detail vertical cross-section taken on line 5—5 in said Fig. 3. Fig. 6 is a detail plan view of a bearing-plate used in said journal-box. Fig. 7 is a detail horizontal section taken on line 7—7 in said Fig. 4, looking in the direction of the arrow $y$.

Similar characters of reference are employed in all of the hereinabove described views, to indicate corresponding parts.

Referring now to the said drawings, the reference-character 1 indicates the casing of the journal-box, the bottom wall 2 of which is constructed to form a downward slope or run from the inner end of said casing toward the outer end thereof. Arranged at the inner end of said casing 1 and connected therewith is a receiving shell 3, the vertical walls of the same being each provided with a hole or opening 4 adapted to permit the passage therethrough and into the journal-box of a car-axle 5 and its journal portion 6. Arranged in said receiving shell 3 so as to be retained thereby is a wiper-plate 7, preferably made of wood, the same being provided with a hole or opening 8 for the reception of said car-axle 5, said hole or opening being of such a diameter as to provide a snug fit of said wiper-plate 7 in connection with said car-axle 5. Arranged at the forward end of said casing 1 and connected therewith is an enlarged portion forming a conveyer-casing 9. Said conveyer-casing 9 is provided at its lower front portion with an inclosing wall 10 whereby a space 11 is provided at the lower end of said conveyer-casing 9 adapted to provide an oil reservoir connecting with the interior of said casing 1. Said conveyer-casing 9 is provided at suitable locations on its outer periphery with perforated ears or lugs 12. Arranged so as to inclose the opening of said conveyer-casing 9 is a cover-plate 13 provided with an offset or flange 14 adapted to engage the upper marginal edge of said inclosing wall 10 of said conveyer-casing. Said cover-plate 13 is further provided with suitably disposed perforated ears or lugs 15 adapted to register with said perforated ears or lugs 12, and said cover-plate 13 is secured in its closing relation by means of bolts 16, or the like, which are arranged in a retaining relation in connection with said respective perforated ears or lugs 12 and 15. Arranged upon the top of said journal-portion 6 within said casing 1 is a bearing-block 17, the same being provided with the usual lining 18, of Babbitt or other non-friction metal. Said journal-portion 6 is provided at its free end with an annular shoulder 19 which engages one end of said bearing-block 17 and thereby prevents any forward longitudinal displacement of the same. The inner sides of said casing 1 are provided with inwardly extending ribs 20, which engaging the respective sides of said bearing-block 17, prevent any lateral displacement of the same. Said bearing-block 17 is further provided at each side with lugs 44, which engaging the one side of said ribs 20, tend to prevent any backward longitudinal displacement of the same. Said bearing-block 17 is formed with a longitudinally extending raised portion 21 provided in its upper surface with a trough or basin 22. The upper surface of said bearing-block 17 is further provided, adjacent to each of its longitudinal edges, with channels or grooves 23, from the bottom of which extend downwardly through the body of said bearing-block a plurality of holes or openings 24, the outside of which open upon the surface of said journal-portion 6. Extending from each of said channels or grooves 23 are a plurality of laterally extending channels or grooves 25. The said lateral channels or grooves 25 extend in to the walls of said trough or basin 22. The said walls of said trough or basin 22 at the end of each of said lateral channels or grooves 25 are cut out to form connecting openings or outlets 26 which connect the interior of said trough or basin 22 with said lateral channels or grooves 25. Arranged between said bearing-block 17 and the top wall of said casing 1 is a wedge or key-block 27 the under surface of which is made to conform with the contour of the upper outline-surface of said bearing-block 17 upon which it rests. Said wedge or key-block 27 serves to support said journal-box with said bearing-block 17 in proper operative relation with said journal portion 6 or said car-axle 5. Said wedge or key-block 27 is provided with a forwardly extending spout 28, which extends into the interior of said conveyer-casing 9, and said spout 28 opens or leads into a vertical opening or hole 29 registering above and connecting with the interior of said trough or basin 22 of said bearing-block 17. Secured by means of bolts, or the like, 30 to the interior end of said journal-portion 6 of said car-axle 5 is a conveyer-disk 31, the same being formed with an outwardly flaring concave body-portion 32, the circumferential periphery 33 of which curves or extends slightly backward toward the end of said journal-portion 6. Secured in any suitable manner upon the rear surface of said concave body-portion 32 of said conveyer disk 31, and registering in position with said circumferential periphery 33 thereof, are a series of pairs of oppositely facing buckets 34, the openings or outlets 35 of which face each other. Said buckets 34 may be formed integrally with said conveyer-disk or may be separably secured thereto. Arranged between the oppositely facing openings or outlets 35 of each pair of buckets 34 is a deflector-block 36 having curved sides 37 extending toward the opening or outlet 35 of each of said buckets 34. When the said conveyer-disk 31 is properly assembled upon the end of said journal-portion 6, the said oppositely facing buckets 34 will be carried upwardly by the revolution of said conveyer-disk 31, so that they will be in a position above and over the end of said spout 28 of said wedge or key-block 27 and will thus empty their contents thereinto. The rear and top walls of said conveyer-casing 9 are formed, at their point of meeting or jointure with a curved portion 38. Connected with the inner side of the rear wall of said conveyer-casing 9, and below said curved portion 38, are a pair of inclined gutters or runways 39, one extending from each side of said conveyer-casing. The inner or outlet ends 40 of said gutters or runways 39 register above said spout 28 of said wedge or key-block 27, and will thus empty their contents thereinto. Said gutters or runways 39 may be formed integrally with said conveyer-casing 9, or may be separably secured thereto, if desired. The said conveyer-casing 9 is further provided in its bottom wall with a concave portion 41 provided with a boss 42, in the screw-threaded opening of which is secured a removable plug 43 which may be removed when it is desired to empty from said reservoir space 11, its store or supply of oil.

The operation of the novel self-oiling journal box, the construction of which is above described, is as follows: A sufficient volume of lubricating oil is placed in said reservoir-space 11 to submerge the lower circumferential periphery of said conveyer-disk 31, so that the buckets 34 carried by said conveyer-disk will dip down into said oil. When the car-axle 5 and its journal portion 6 revolve slowly, said conveyer-disk 31 will also revolve, so that one or the other of each of said series of pairs of buckets 34 will dip down into the oil and fill themselves, according to the direction in which said car-axle, journal-portion and conveyer-disk are revolving. The revolution of said conveyer-disk 31 elevates said oil-filled buckets 34, bringing the same above and over said spout 28 of said wedge or key-block 27. When in this position, the oil carried by said buckets 34 flows out of the opening or outlet 35 and striking one or the other of the inclined walls 37 of said deflector-blocks 36 is caused to flow into said spout 28 and thence through the opening or passage 29 into the trough or basin 22 of said bearing-block 17. From said trough or basin 22, the oil flows through the outlets 26 and lateral channels or grooves 25 into the grooves or channels 23 and thence through said openings or passages 24 directly upon the surface of said journal-portion 6 which is constantly washed with the flowing oil and hence kept perfectly lubricated. The oil drops from the journal-portion 6 upon the inclined bottom wall 2 of said journal-box casing 1, whence it returns to said reservoir-space 11 in said conveyer-casing 9. It will thus be seen, that a constant circulation of oil is maintained in said journal-box no matter how slowly the journal-portion 6 turns; hence, the latter is always supplied with the lubricant from the moment it begins its revolutions. It will also be understood from the above description, that when the journal-portion 6 is turning at slow speeds the circulation of the oil is caused, initially, by the purely mechanical operation of said conveyer-disk and its buckets in lifting the oil against the force of gravity. When the journal-portion 6 travels at high speeds, there is a consequent high speed-revolution of said conveyer-disk 31 which would be so rapid as to interfere with the proper mechanical elevation or conveyance and distribution of the oil; therefore, a different mode of operation ensues. When traveling at high speeds the conveyer-disk and its buckets travel through the oil in the reservoir-space 11 very rapidly so that a large portion of its surface is washed or spread with the lubricant. The oil thus carried is caused to fly off the circumferential periphery 33 of said conveyer-disk, which being concave tends, through the action of centrifugal force, to cause the oil to be thrown off against the upper wall and the curved or inclined portion 38 of said conveyer-casing 9. The oil thus coming in contact with said curved or inclined portion 38 tends to flow downwardly following the inclination or curve of said portion 38 which directs its flow into said spout 28, whence it flows to said bearing-block 17 and is distributed thereby upon said journal-portion 6 in the manner above described. It will thus be clearly understood that the construction of self-oiling journal-box operates upon two entirely different principles depending upon the speed at which said journal-portion 6 travels, both of which modes of operation, however, provide a perfect circulation of oil under all conditions. This is a marked advantage over the old type of self-oiling journal-boxes which operate exclusively either by one or the other of the conveying principles, and thus fail to fulfil their functions, except under certain required conditions of use or speeds of the journal supported thereby.

I am aware that changes may be made in the various arrangements and combinations of the parts of the novel construction of self-oiling journal-box hereinabove described without departing from the scope of my present invention. Hence I do not limit my invention to the exact arrangements and combinations of the parts as described in the previous specification and as illustrated in the accompanying drawings, nor do I confine myself to the exact details of the construction of the said parts.

I claim:

1. A self-oiling journal box comprising a casing for the reception of a journal, a bearing-block provided with oil-distributing passages arranged in said casing and upon said journal, a wedge or key-block arranged upon said bearing-block, means in said wedge or key-block for conveying oil to said bearing-block, a conveyer-casing providing a reservoir for the oil, a conveyer-disk secured in connection with said journal so as to turn therewith, buckets connected with said conveyer-disk for raising the oil from said reservoir-space and delivering the same directly to said oil-conveying means in said wedge or key-block when said journal rotates at slow speed, said conveyer-casing being provided in its upper rear wall with a curved portion for receiving the oil thrown thereupon, a pair of gutters connected with said conveyer-casing adapted to catch the oil flowing from said curved portion and deliver the same to said oil-conveying means in said wedge or key-block, and a rearwardly extending curved marginal edge at the periphery of said conveyer-disk adapted to throw the oil upon said curved portion of said conveyer-casing when said journal rotates at fast speed, substantially as and for the purposes set forth.

2. A self-oiling journal-box comprising a casing, a journal rotating in said casing, a bearing-block provided with oil-distributing passages arranged in said casing and upon said journal, a wedge or key-block arranged upon said bearing-block, means in said wedge or key-block for conveying oil to said bearing-block, a receiving shell connected with one end of said casing, said receiving shell being provided with openings to permit the passage of said journal, a wiper-plate arranged in said receiving-shell and in connection with said journal, a conveyer-casing providing a reservoir-space for oil connected with the other end of said casing, a conveyer-disk secured in connection with said journal so as to rotate therewith, buckets connected with said conveyer-disk for raising the oil from said reservoir-space and delivering the same directly to said oil-conveying means in said wedge or key-block when said journal rotates at slow speed, said conveyer-casing being provided in its rear wall with a curved portion, a pair of gutters connected with said rear wall beneath said curved portion and adapted to receive the oil flowing from said curved portion and deliver the same to said oil-conveying means in said wedge or key-block, and a rearwardly extending curved marginal edge at the periphery of said conveyer-disk adapted to throw the oil upon said curved portion of said conveyer-casing when said journal rotates at fast speed, substantially as and for the purposes set forth.

3. A self-oiling journal box comprising a casing, a journal rotating in said casing, a bearing-block provided with oil-distributing passages arranged in said casing and upon said journal, means for preventing lateral and longitudinal displacement of said bearing-block, a wedge or key-block arranged upon said bearing-block, a conveyer-casing connected with one end of said casing and providing in its lower portion a reservoir-space for oil, a spout connected with said wedge or key-block adapted to extend into the interior of said conveyer-casing, said wedge or key-block being provided with oil-passages connecting said spout with said oil-distributing passages of said bearing-block, a conveyer-disk secured to said journal, buckets connected with said conveyer-disk for raising the oil from said reservoir-space and delivering the same directly to said spout when said journal rotates at slow speed, said conveyer-casing being provided in its upper rear wall with a curved portion, a pair of gutters connected with said rear wall beneath said curved portion and adapted to receive the oil therefrom and deliver the same to said spout, and a rearwardly extending curved marginal edge at the periphery of said conveyer-disk adapted to throw the oil upon said curved or inclined portion of said conveyer-casing when said journal rotates at fast speed, substantially as and for the purposes set forth.

In testimony, that I claim the invention set forth above I have hereunto set my hand this 17th day of August, 1910.

FERDINAND H. KOERNER.

Witnesses:
FREDK. C. FRAENTZEL,
FREDK. H. W. FRAENTZEL.